US009311318B1

(12) United States Patent
Afonso et al.

(10) Patent No.: US 9,311,318 B1
(45) Date of Patent: Apr. 12, 2016

(54) BACKUP SYSTEMS AND METHODS FOR A VIRTUAL COMPUTING ENVIRONMENT

(71) Applicant: Dell Software Inc., Aliso Viejo, CA (US)

(72) Inventors: Delano Xavier Afonso, Vernon Hills, IL (US); David Allen Feathergill, Woodstock, IL (US); Jason Mattox, Spring Grove, IL (US); Jeremy Christopher Herman, Waukegan, IL (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 13/764,011

(22) Filed: Feb. 11, 2013

Related U.S. Application Data

(63) Continuation of application No. 13/244,187, filed on Sep. 23, 2011, now Pat. No. 8,375,003, which is a continuation of application No. 12/502,052, filed on Jul. 13, 2009, now Pat. No. 8,060,476.

(60) Provisional application No. 61/080,531, filed on Jul. 14, 2008, provisional application No. 61/085,745, filed on Aug. 1, 2008.

(51) Int. Cl.
G06F 17/30 (2006.01)

(52) U.S. Cl.
CPC ................................ *G06F 17/30091* (2013.01)

(58) Field of Classification Search
CPC ............ G06F 11/1448; G06F 11/1469; G06F 17/30079; G06F 2201/84; G06F 2201/815; G06F 17/30067; G06F 17/302; G06F 17/30215; G06F 2009/45562; G06F 3/067; G06F 11/1451

USPC .......................................................... 707/645
See application file for complete search history.

(56) References Cited

U.S. PATENT DOCUMENTS

| 4,130,867 A | 12/1978 | Bachman et al. |
| 4,648,031 A | 3/1987 | Jenner |
| 4,665,520 A | 5/1987 | Strom et al. |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Pierre Vital
*Assistant Examiner* — Evan Aspinwall
(74) *Attorney, Agent, or Firm* — Winstead PC

(57) ABSTRACT

Improved backup and storage operations are disclosed for virtual computing environments using a backup proxy server to perform storage operations on one or more virtual machine disks. The proxy server can include a module that intercepts application programming interface (API) calls, for writing backup data to a first location, prior to the data arriving on the proxy disk. During the intercept process, the data can be compressed in memory pages of the proxy server and redirected to an alternative backup disk location. The proxy server can also include a differential engine that identifies changes to the virtual machine disk at the block level since the last full backup. The differential engine can advantageously leverage memory pages of the proxy server to compare differences between signatures of blocks of the last full backup with signatures of new blocks. Subsequently, only blocks with non-matching signatures are processed for backup.

9 Claims, 5 Drawing Sheets

(56) References Cited

U.S. PATENT DOCUMENTS

| | | | |
|---|---|---|---|
| 5,222,235 A | 6/1993 | Hintz et al. | |
| 5,297,279 A | 3/1994 | Bannon et al. | |
| 5,325,505 A | 6/1994 | Hoffecker et al. | |
| 5,333,314 A | 7/1994 | Masai et al. | |
| 5,414,650 A | 5/1995 | Hekhuis | |
| 5,422,979 A | 6/1995 | Eichfeld et al. | |
| 5,423,037 A | 6/1995 | Hvasshovd | |
| 5,455,945 A | 10/1995 | VanderDrift | |
| 5,530,855 A | 6/1996 | Satoh et al. | |
| 5,551,020 A | 8/1996 | Flax et al. | |
| 5,553,303 A | 9/1996 | Hayashi et al. | |
| 5,596,504 A | 1/1997 | Tata et al. | |
| 5,596,747 A | 1/1997 | Katabami et al. | |
| 5,634,052 A | 5/1997 | Morris | |
| 5,640,561 A | 6/1997 | Satoh et al. | |
| 5,655,081 A | 8/1997 | Bonnell et al. | |
| 5,664,186 A | 9/1997 | Bennett | |
| 5,721,915 A | 2/1998 | Sockut et al. | |
| 5,758,356 A | 5/1998 | Hara et al. | |
| 5,761,667 A | 6/1998 | Koeppen | |
| 5,761,677 A | 6/1998 | Senator et al. | |
| 5,774,717 A | 6/1998 | Porcaro | |
| 5,778,377 A | 7/1998 | Marlin et al. | |
| 5,778,392 A | 7/1998 | Stockman et al. | |
| 5,796,934 A | 8/1998 | Bhanot et al. | |
| 5,799,322 A | 8/1998 | Mosher, Jr. | |
| 5,822,780 A | 10/1998 | Schutzman | |
| 5,848,416 A | 12/1998 | Tikkanen | |
| 5,893,924 A | 4/1999 | Vakkalagadda | |
| 5,933,818 A | 8/1999 | Kasravi et al. | |
| 5,933,820 A | 8/1999 | Beier et al. | |
| 5,940,832 A | 8/1999 | Hamada et al. | |
| 5,943,677 A | 8/1999 | Hicks | |
| 5,948,108 A | 9/1999 | Lu et al. | |
| 5,951,694 A | 9/1999 | Choquier et al. | |
| 5,951,695 A | 9/1999 | Kolovson | |
| 5,956,489 A | 9/1999 | San Andres et al. | |
| 5,956,504 A | 9/1999 | Jagadish et al. | |
| 5,978,594 A | 11/1999 | Bonnell et al. | |
| 5,983,239 A | 11/1999 | Cannon | |
| 5,990,810 A | 11/1999 | Williams | |
| 5,991,761 A | 11/1999 | Mahoney et al. | |
| 5,995,958 A | 11/1999 | Xu | |
| 6,003,022 A | 12/1999 | Eberhard et al. | |
| 6,016,497 A | 1/2000 | Suver | |
| 6,026,412 A | 2/2000 | Sockut et al. | |
| 6,029,195 A | 2/2000 | Herz | |
| 6,067,410 A | 5/2000 | Nachenberg | |
| 6,067,545 A | 5/2000 | Wolff | |
| 6,070,170 A | 5/2000 | Friske et al. | |
| 6,119,128 A | 9/2000 | Courter et al. | |
| 6,122,640 A | 9/2000 | Pereira | |
| 6,151,607 A | 11/2000 | Lomet | |
| 6,157,932 A | 12/2000 | Klein et al. | |
| 6,185,699 B1 | 2/2001 | Haderle et al. | |
| 6,243,715 B1 | 6/2001 | Bogantz et al. | |
| 6,253,212 B1 | 6/2001 | Loaiza et al. | |
| 6,289,357 B1 | 9/2001 | Parker | |
| 6,314,421 B1 | 11/2001 | Sharnoff et al. | |
| 6,343,296 B1 | 1/2002 | Lakhamraju et al. | |
| 6,363,387 B1 | 3/2002 | Ponnekanti et al. | |
| 6,411,964 B1 | 6/2002 | Iyer et al. | |
| 6,460,048 B1 | 10/2002 | Teng et al. | |
| 6,470,344 B1 | 10/2002 | Kothuri et al. | |
| 6,477,535 B1 | 11/2002 | Mirzadeh | |
| 6,499,039 B1 | 12/2002 | Venkatesh et al. | |
| 6,519,613 B1 | 2/2003 | Friske et al. | |
| 6,523,035 B1 | 2/2003 | Fleming et al. | |
| 6,584,474 B1 | 6/2003 | Pereira | |
| 6,606,626 B1 | 8/2003 | Ponnekanti | |
| 6,631,478 B1 | 10/2003 | Wang et al. | |
| 6,671,721 B1 | 12/2003 | Branson et al. | |
| 6,681,386 B1 | 1/2004 | Amin et al. | |
| 6,691,139 B2 | 2/2004 | Ganesh et al. | |
| 6,721,742 B1 | 4/2004 | Uceda-Sosa et al. | |
| 6,728,780 B1 | 4/2004 | Hebert | |
| 6,834,290 B1 | 12/2004 | Pugh et al. | |
| 6,859,889 B2 * | 2/2005 | Matsuura et al. | 714/6.32 |
| 6,907,512 B2 * | 6/2005 | Hill et al. | 711/207 |
| 6,950,834 B2 | 9/2005 | Huras et al. | |
| 6,959,441 B2 | 10/2005 | Moore | |
| 7,065,538 B2 | 6/2006 | Aronoff et al. | |
| 7,085,900 B2 * | 8/2006 | Inagaki et al. | 711/162 |
| 7,093,086 B1 | 8/2006 | van Rietschote | |
| 7,340,486 B1 * | 3/2008 | Chapman | |
| 7,370,164 B1 | 5/2008 | Nagarkar et al. | |
| 7,447,854 B1 * | 11/2008 | Cannon | 711/162 |
| 7,461,103 B2 | 12/2008 | Aronoff et al. | |
| 7,546,325 B2 * | 6/2009 | Kamei et al. | |
| 7,610,331 B1 | 10/2009 | Genske et al. | |
| 7,657,581 B2 | 2/2010 | Orenstein et al. | |
| 7,669,020 B1 | 2/2010 | Shah et al. | |
| 7,707,185 B1 * | 4/2010 | Czezatke et al. | 707/649 |
| 7,752,487 B1 * | 7/2010 | Feeser et al. | 714/4.11 |
| 7,765,400 B2 | 7/2010 | Costea et al. | |
| 7,769,722 B1 * | 8/2010 | Bergant et al. | 707/681 |
| 7,805,423 B1 | 9/2010 | Romine et al. | |
| 7,844,577 B2 * | 11/2010 | Becker et al. | 707/646 |
| 7,849,267 B2 | 12/2010 | Lam et al. | |
| 7,895,161 B2 | 2/2011 | Sugimoto et al. | |
| 7,925,850 B1 | 4/2011 | Waldspurger et al. | |
| 1,016,129 A1 | 6/2011 | Vengerov et al. | |
| 8,001,596 B2 | 8/2011 | Wollnik et al. | |
| 8,010,495 B1 | 8/2011 | Kuznetzov et al. | |
| 8,046,550 B2 | 10/2011 | Feathergill | |
| 8,060,476 B1 | 11/2011 | Afonso et al. | |
| 8,135,930 B1 | 3/2012 | Mattox et al. | |
| 8,166,265 B1 | 4/2012 | Feathergill | |
| 8,250,033 B1 | 8/2012 | De Souter et al. | |
| 8,286,019 B2 | 10/2012 | Murase | |
| 8,335,902 B1 | 12/2012 | Feathergill | |
| 8,412,848 B2 | 4/2013 | Therrien et al. | |
| 8,464,214 B2 | 6/2013 | Miloushev et al. | |
| 8,627,198 B2 | 1/2014 | Martinsen et al. | |
| 2003/0145074 A1 | 7/2003 | Penick | |
| 2004/0024961 A1 * | 2/2004 | Cochran et al. | 711/112 |
| 2004/0030822 A1 * | 2/2004 | Rajan et al. | 711/4 |
| 2004/0236803 A1 * | 11/2004 | Spiegeleer | 707/204 |
| 2005/0114614 A1 | 5/2005 | Anderson et al. | |
| 2005/0278280 A1 | 12/2005 | Semerdzhiev et al. | |
| 2006/0005189 A1 | 1/2006 | Vega et al. | |
| 2006/0020932 A1 | 1/2006 | Bentz et al. | |
| 2006/0143501 A1 | 6/2006 | Tormasov et al. | |
| 2006/0155735 A1 | 7/2006 | Traut et al. | |
| 2006/0218544 A1 | 9/2006 | Chakraborty et al. | |
| 2007/0208918 A1 * | 9/2007 | Harbin et al. | 711/162 |
| 2007/0234334 A1 | 10/2007 | Araujo, Jr. et al. | |
| 2007/0244938 A1 | 10/2007 | Michael et al. | |
| 2008/0082593 A1 | 4/2008 | Komarov et al. | |
| 2008/0155208 A1 | 6/2008 | Hiltgen et al. | |
| 2008/0177994 A1 | 7/2008 | Mayer | |
| 2008/0201414 A1 | 8/2008 | Amir Husain et al. | |
| 2008/0244028 A1 | 10/2008 | Le et al. | |
| 2008/0244577 A1 | 10/2008 | Le et al. | |
| 2008/0250406 A1 | 10/2008 | Carpenter et al. | |
| 2009/0007100 A1 | 1/2009 | Field et al. | |
| 2009/0089781 A1 | 4/2009 | Shingai et al. | |
| 2009/0158432 A1 | 6/2009 | Zheng et al. | |
| 2009/0216816 A1 | 8/2009 | Basler et al. | |
| 2009/0216970 A1 | 8/2009 | Basler et al. | |
| 2009/0240904 A1 | 9/2009 | Austruy et al. | |
| 2009/0265403 A1 | 10/2009 | Fukumoto | |
| 2009/0300023 A1 * | 12/2009 | Vaghani | 707/10 |
| 2010/0030983 A1 | 2/2010 | Gupta et al. | |
| 2010/0049930 A1 * | 2/2010 | Pershin et al. | 711/162 |
| 2010/0058013 A1 | 3/2010 | Gelson et al. | |
| 2010/0070725 A1 | 3/2010 | Prahlad et al. | |
| 2010/0076934 A1 | 3/2010 | Pershin et al. | |
| 2010/0077165 A1 | 3/2010 | Lu et al. | |
| 2010/0088277 A1 | 4/2010 | Rao et al. | |
| 2010/0115332 A1 | 5/2010 | Zheng et al. | |
| 2010/0122248 A1 | 5/2010 | Robinson et al. | |
| 2010/0185587 A1 | 7/2010 | Lovinger | |
| 2010/0228913 A1 | 9/2010 | Czezatke et al. | |

(56) References Cited

U.S. PATENT DOCUMENTS

| | | | |
|---|---|---|---|
| 2010/0235813 A1 | 9/2010 | Manczak et al. |
| 2010/0235831 A1 | 9/2010 | Dittmer |
| 2010/0235832 A1 | 9/2010 | Rajagopal et al. |
| 2010/0257331 A1 | 10/2010 | Frank |
| 2010/0262585 A1 | 10/2010 | Rosikiewicz et al. |
| 2010/0262586 A1 | 10/2010 | Rosikiewicz et al. |
| 2010/0262802 A1 | 10/2010 | Goebel et al. |
| 2010/0293140 A1 | 11/2010 | Nishiyama |
| 2010/0306412 A1 | 12/2010 | Therrien et al. |
| 2011/0035358 A1 | 2/2011 | Naik |
| 2011/0047340 A1 | 2/2011 | Olson et al. |
| 2011/0145199 A1 | 6/2011 | Prasad Palagummi |
| 2011/0153697 A1 | 6/2011 | Nickolov et al. |
| 2011/0154325 A1 | 6/2011 | Terasaki |
| 2011/0225122 A1 | 9/2011 | Denuit et al. |
| 2012/0084598 A1 | 4/2012 | Alibakhsh et al. |
| 2012/0109897 A1 | 5/2012 | Janakiraman et al. |
| 2012/0297246 A1 | 11/2012 | Liu et al. |
| 2013/0007506 A1 | 1/2013 | Jain et al. |
| 2013/0014102 A1 | 1/2013 | Shah |
| 2013/0097599 A1 | 4/2013 | Konik et al. |
| 2013/0185716 A1 | 7/2013 | Yin et al. |
| 2013/0246685 A1 | 9/2013 | Bhargava et al. |

OTHER PUBLICATIONS

"The What, How and Where of Deduplication", Spectra nTier with FalconStor Deduplication, Spectra Logic Corporation, May 2008, in 12 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Computer Associates, "Platinum OnlineReorg Technical Overview, OnlineReorg", http://platinum.com/products/custstor/tsreorq.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorq.htm, 3 pages downloaded on Nov. 30.

EMC Deduplication Frequently Asked Questions, http://www.datadomain.com/resources/faq.html, downloaded Jun. 7, 2011, 4 pages.

Harley Stagner, "Aligning disk partitions to boost virtual machine performance", Vmware Management, Migration and Performance, http://searchvmware.techtarget.com/tip/0,289483,sid179_qci1344730_mem1,00.html, Jan. 28, 2009, pp. 1-5.

Jeff Graves, "Partition Alignment", ORCS Web Team Blog, http://www.orcsweb.com/blog, Sep. 14, 2009, pp. 1-2.

Jin, Keren et al.,"The Effectiveness of Deduplication on Virtual Machine Disk Images", SYSTOR 2009, May 2009, in 12 pages.

John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).

Joseph Pagano, paper on Microsoft Exchange Disaster Recovery Planning, document version 3.00, 1996, in 39 pages.

K. Loney, et al., "Oracle8i, DB Handbook," Oracle Press, 2000, p. 20.

L. Leverenz, et al., "Oracle8i Concepts," Oracle Corp., vol. 2, Release 8.1.5, 1999, p. 20-3.

Massiglia, Paul, "Block-Level Incremental Backup", VERITAS Software Corporation, Feb. 2000, in 13 pages.

Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMWARE, "Recommendations for Aligning VMFS Partitions", VMware Infrastructure 3, VMware Performance Study, Feb. 2009, pp. 1-10.

VMWARE, Inc., "VMware Virtual Machine File System: Technical Overview and Best Practices", A VMware Technical White Paper, http://www.vmware.com/support/, 2007, Issue Version 1.0, pp. 1-19.

Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.

Kleo Bare Metal Backup, Wikipedia, retrieved from http://en.wikipedia.org/wiki/Kleo_Bare_Metal_Backup on Apr. 14, 2010, in 3 pages.

Veritas NetBackup for VMware Adminstrator's Guide, UNIX, Windows, and Linux, Release 6.5.4, Symantec Corporation, 2009, in 66 pages.

Data Sheet: Data Protection, "Symantec NetBackup 7, The Symantec NetBackup Platform: Complete protection for your information-driven enterprise," Symantec Corporation, Dec. 2009, in 8 pages.

Veeam Technology Overview, "The New Standard for Data Protection," Veeam Software, Apr. 2010, in 2 pages.

Backup Critic, "File Versus Image Backups," retrieved from http://www.backuperitic.com/software-buyer/file-verus-image on May 4, 2010, in 3 pages.

Microsoft TechNet, Windows Server 2003, retrieved from http://technet.microsoft.com/en-us/library/cc706993(WS.10,printer).aspx on Aug. 3, 2011, in 6 pages.

MSDN, Overview of Processing a Backup Under VSS, retrieved from http://msdn.microsoft.com/en-us/library/aa384589(d=printer,v=VS.85).aspx on Aug. 3, 2011, in 5 pages.

U.S. Appl. No. 12/566,231, filed Sep. 24, 2009, Feathergill et al.

U.S. Appl. No. 12/762,162, filed Apr. 16, 2010, Mattox, Jason.

U.S. Appl. No. 13/218,362, filed Aug. 25, 2011, Feathergill et al.

U.S. Appl. No. 13/244,187, filed Sep. 23, 2011, Afonso et al.

U.S. Appl. No. 13/368,240, filed Feb. 7, 2012, Naik, Dilip.

Armstrong, Ben, "How Do I Fix a Corrupted Virtual Hard Disk?", Virtual PC Guy's Blog, Jan. 7, 2009, in 4'pages.

Microsoft Corporation Technet, "Compacting Dynamically Expanding Virtual Hard Disks", retrieved Feb. 6, 2012, in 2 pages.

Microsoft Corporation Technet, "To Compact a Dynamically Expanding Virtual Hard Disk", retrieved Feb. 6, 2012, in 1 page.

Microsoft Corporation, "Microsoft Windows XP—Compact", Command-line reference A-Z, retrieved Feb. 6, 2012, in 2 pages.

Naik, Dilip, "Virtual Machine Storage—often overlooked optimizations", 2010 Storage Developer Conference, Storage Networking Industry Association, Sep. 2010, in 21 pages.

Russinovich, Mark, "SDelete v1.6", Windows Sysinternals, published Sep. 1, 2011, in 3 pages.

U.S. Appl. No. 13/368,240, filed Feb. 7, 2012, titled "Systems and Methods for Compacting a Virtual Machine File", in 44 pages.

U.S. Appl. No. 13/852,164, filed Mar. 25, 2013, Feathergill.

U.S. Appl. No. 13/156,199, filed Jun. 8, 2011, Feathergill.

Afonso, Delano Xavier, U.S. Appl. No. 13/764,011, filed Feb. 11, 2013.

\* cited by examiner

```
                                            ┌─400
        ┌ ┌─────────────────────────────────────────────┐
    402 │ │ File=C:\temp\VCBLiveTest\scsi0-0-0-          │
        └ │ VCBLiveTest_1-flat.vmdk;                     │
        ┌ │ 1=1ae0d8232c60478356cc5e94f051d759,2=a60d29  │
        │ │ aa00d6c9f5dfb3ff7a5bcfc183,3=9fe56b62a64dc29d│
        │ │ 954bd1646b57a0d7,4=9499fb5f3ed673b15b616c1e  │
        │ │ 97bc848c,5=26e5119659a4505fba5b7d58c9d98f9e, │
    404 │ │ 6=7454906e04f75f4248dcab0dcc145768,7=cc7625  │
        │ │ 5db37e207cc04273f15fe69783,8=395b033a306a4d  │
        │ │ 2ed907bb57308e9ecb,9=127dc79a63127dc7a9c2e   │
        │ │ d73a3033983,10=0a6ddd2501e7344fd4c231cb54cb  │
        └ │ a42f,                                        │
          └─────────────────────────────────────────────┘
```

*FIG. 4*

| FIELD OFFSET | FIELD SIZE | DESCRIPTION |
|---|---|---|
| 0 | 4 | FILE IDENTIFIER |
| 4 | 5 | FILE VERSION |
| 9 | 8 | FILE CREATION TIME |
| 17 | 4 | COMPRESSION TYPE |
| 21 | 491 | UNUSED |

*FIG. 5A*

BACKUP SYSTEMS AND METHODS FOR A VIRTUAL COMPUTING ENVIRONMENT

RELATED APPLICATIONS

This application is a continuation of U.S. patent application Ser. No. 13/244,187, filed Sep. 23, 2011. U.S. patent application Ser. No. 13/244,187 is a continuation of U.S. patent application Ser. No. 12/502,052, filed Jul. 13, 2009, which claims the benefit of priority under 35 U.S.C. §119(e) of U.S. Provisional Patent Application No. 61/080,531, filed Jul. 14, 2008, and of U.S. Provisional Patent Application No. 61/085,745, filed Aug. 1, 2008. Each of the foregoing provisional and nonprovisional applications is hereby incorporated by reference herein in its entirety to be considered part of this specification.

BACKGROUND

1. Field

Embodiments of the invention relate to performing storage operations in a virtual environment and, in particular, to backing up data of one or more virtual machines.

2. Description of the Related Art

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers to one or more virtual machines and further provides for isolation between such virtual machines. In such a manner, the virtual machine is a representation of a physical machine by software.

Associated with each virtual machine is at least one virtual machine disk that is located in one or more files on a datastore. The virtual machine disk can be copied, moved, archived or the like. For instance, certain vendors offer solutions that operate from inside the guest operating system of a virtual machine to back up the virtual machine disk(s). This approach, however, has significant drawbacks in that such backup copies, being performed from within the guest operating system, cannot capture a backup of the entire virtual machine. Moreover, other backup solutions require a full copy of the virtual machine disk to a backup proxy device each time a backup is to be performed.

SUMMARY

Given the aforementioned issues and challenges, a need exists for systems and methods that perform backup operations in a virtual computing environment without operating through the server(s) hosting the virtual machines. Moreover, there is a need for data management solutions that back up virtual machine disks without consuming the resources and time required for a full copy of the virtual machine disks to be made to a backup proxy prior to being stored to a final destination on disk.

In view of the foregoing, certain systems and methods disclosed herein are directed to improved backup and storage operations for virtual computing environments. In certain embodiments, a backup proxy server is utilized to perform LAN-free storage operations by directly accessing virtual machine disk data stored on a storage attached network (SAN). The backup proxy server can further include an intercept engine executing thereon that intercepts a data stream from the SAN prior to the data stream arriving on the proxy server disk. During the intercept process, individual data blocks of the data stream can be optionally compressed in memory pages of the proxy server and redirected to a backup disk location of the administrator's choice, without occupying disk space on the proxy server.

As a result of this backup process, the final backup image size can be reduced via compression, and the overall storage process can be expedited significantly since the need is removed for the proxy server disk to serve as an intermediate location for the backup data prior to the final backup. The backup proxy can further utilize a differential engine to identify block-level changes made to the virtual machine disk since the time of the last full backup. The differential engine can advantageously leverage memory pages of the proxy server to compare differences between signatures of blocks of the last full backup with signatures of new blocks to reduce the amount of backup data written to disk.

In certain embodiments, a method is disclosed for performing backup of virtual machine data. The method includes initiating a backup process executing on a computing device to access one or more virtual machine disks stored on a datastore, the one or more virtual machine disks being comprised of a plurality of data blocks. The method also includes intercepting a plurality of calls made by the backup process to create a backup file in a first destination location that comprises a copy of the one or more virtual machine disks, the plurality of calls comprising at least one write call programmed to write a backup copy of each of the plurality of data blocks to the first destination location. For each intercepted write call, the method substitutes the intercepted write call with at least a second write call, wherein the at least the second write call is further programmed to: (i) transfer the data block associated with the particular intercepted write call to a buffer memory without writing the data block to a disk of the computing device, (ii) compute a signature of the data block, and (iii) compare the computed signature with a predetermined signature. For each data block having a computed signature that differs from the predetermined signature, the method compresses and stores the data block to a second destination location different than the first destination location. The method also disregards each data block having a computed signature that matches the predetermined signature.

In certain embodiments, a system is disclosed for performing backup of virtual machine data. The system includes a storage device comprising one or more virtual machine disks and an intercept module configured to redirect backup operations of a backup module executing on a computing device and accessing a plurality of data blocks of the one or more virtual machine disks. The intercept module further comprises (i) a proxy application configured to instruct the backup module to initiate a backup of the one or more virtual machine disks via a plurality of application programming interface (API) calls to create a backup file in a first destination location, wherein the backup file comprises a copy of the one or more virtual machine disks, and (ii) a library module configured to replace select API calls of the plurality of API calls by the backup module with alternative functions to transfer each data block associated with a write call of the select API calls to a buffer memory of the computing device without writing the data block to a disk of the computing device; compute a signature of the data block; compare the computed signature with a predetermined signature; and for each data block having a computed signature that differs from the predetermined signature and storing the data block to a second destination location different from the first destination location.

In certain embodiments, a method is disclosed for performing backup of virtual machine data. The method comprises intercepting a plurality of write calls for creating a backup copy of a plurality of data blocks of a virtual machine disk at a first destination location and substituting each intercepted write call with a second write call. The second write call is programmed to (i) transfer the data block associated with the particular write call to a buffer memory without first writing the data block to disk, (ii) compute a signature of the data block, and (iii) compare the computed signature with a predetermined signature. For each data block having a computed signature that differs from the predetermined signature, the method stores the data block to a second destination location different than the first destination location. The method also includes disregarding each data block having a computed signature that matches the predetermined signature.

In certain embodiments, a system for performing backup operations on virtual machine data is disclosed. The system includes: means for initiating a backup process executing on a computing device to access one or more virtual machine disks stored on a datastore, the one or more virtual machine disks comprising a plurality of data blocks; and means for intercepting a plurality of calls made by the backup process to create a backup file in a first destination location of a copy of the one or more virtual machine disks, the plurality of calls comprising write calls programmed to write a backup copy of each of the plurality of data blocks to the first destination location The intercepting means is further configured to, for each intercepted write call, substitute the intercepted write call with a second write call, wherein the second write call is further programmed to: (i) transfer the data block associated with the particular intercepted write call to a buffer memory without writing the data block to a disk of the computing device, (ii) generate a signature of the data block, (iii) compare the signature with a predetermined signature, (iv) for each data block having a signature that differs from the predetermined signature, store the data block to a second destination location, and (v) disregard each data block having a signature that matches the predetermined signature.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 4 illustrates an exemplary embodiment of a signature file usable by the backup proxy during the backup process of FIG. 3.

FIGS. 5A-5C illustrate exemplary embodiments of headers usable with a differential file created through the backup process of FIG. 3.

DETAILED DESCRIPTION OF THE PREFERRED EMBODIMENTS

Figure 1:
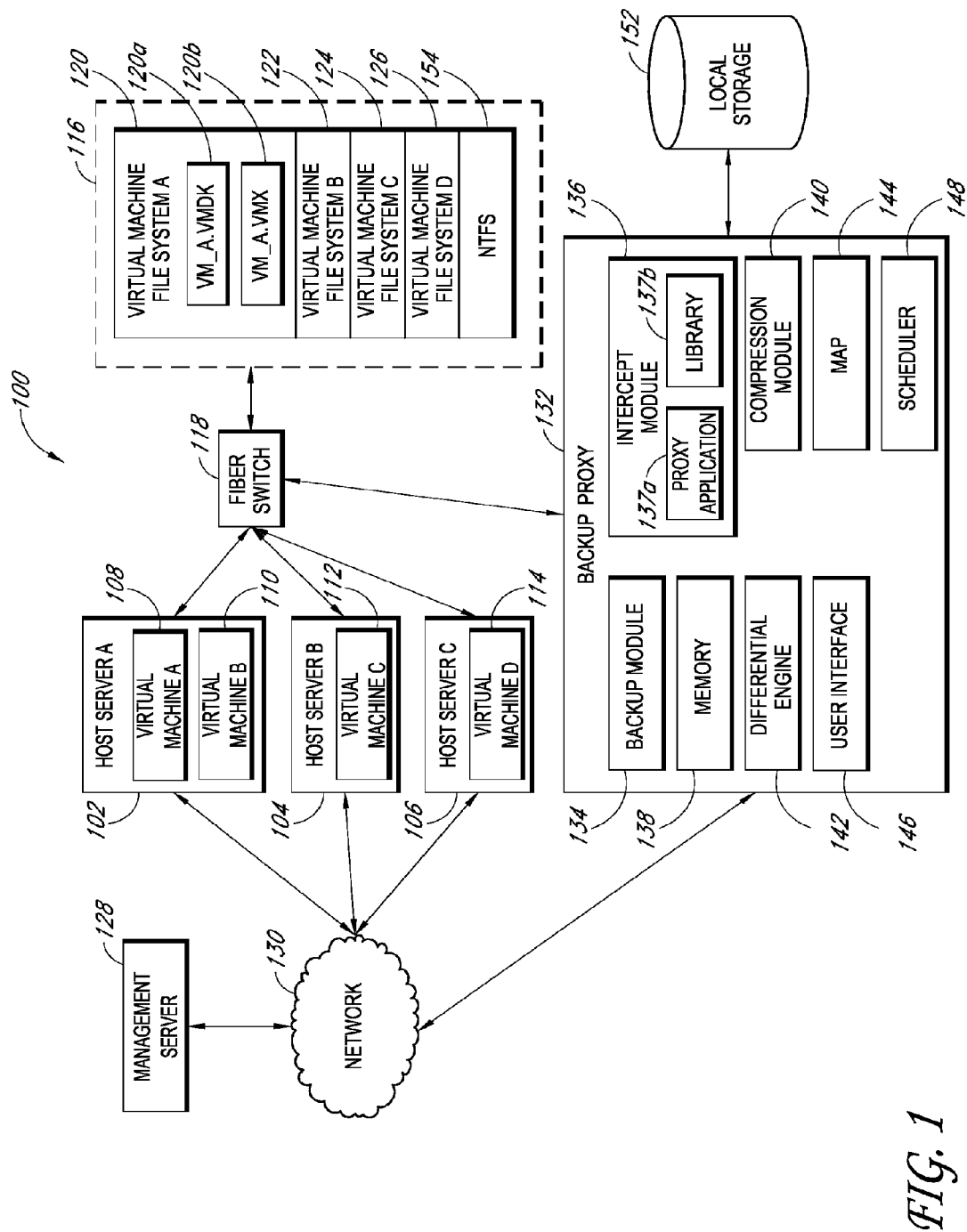
FIG. 1 illustrates an exemplary block diagram of a system for performing backup operations in a virtual computing environment, according to certain embodiments of the invention.

Certain systems and methods disclosed herein are directed to improved backup and storage operations for virtual computing environments. In certain embodiments, a backup proxy server is utilized to perform LAN-free storage operations by directly accessing virtual machine disk data stored on a SAN. The backup proxy server can further include a module that intercepts a data stream from the SAN prior to the data stream arriving on the proxy server disk. During the intercept process, the data can be compressed in memory pages of the proxy server and redirected to a backup disk location of the administrator's choice, without consuming disk space on the proxy server for temporarily storing an intermediate backup copy. In other embodiments, backup systems and methods can perform similar interception and compression techniques over an internet protocol (IP) network with network attached storage (NAS) or the like.

Such backup methods can result in a smaller backup image on disk, due to compression, and can expedite the overall storage process significantly since the need is removed to first write the data to the proxy server disk and then to the backup disk. For example, in certain embodiments, the backup throughput can be increased up to forty percent (40%) or more by avoiding the writing of the backup data to disk prior to performing the actual backup of the data.

In addition, the backup proxy can further comprise a differential engine that identifies changes to the virtual machine disk at the block level since the last full backup. The differential engine can advantageously leverage memory pages of the proxy server to compare differences between signatures of blocks of the last full backup with signatures of new blocks. Subsequently, only blocks with non-matching signatures are processed for backup (e.g., a differential backup).

Certain embodiments of the invention advantageously include systems and methods for performing differential backup operations in combination with VMWARE CONSOLIDATED BACKUP (VCB) offered by VMware Inc. (Palo Alto, Calif.) or other hypervisor snapshot technology in a virtual computing environment.

The features of the inventive systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

For exemplary purposes, certain embodiments of the inventive systems and methods will be described with reference to VMWARE virtual infrastructures. However, it will be understood from the disclosure herein that the disclosed systems and methods can be utilized with other virtualization technologies, including, but not limited to, virtual environments using XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

FIG. 1 illustrates an exemplary block diagram of a system for performing backup operations in a virtual computing environment 100, according to certain embodiments of the invention. In general, the virtual computing environment 100 is advantageously configured for backing up virtual machine disk data. For example, the virtual computing environment 100 can perform LAN-free storage operations on data of one or more virtual machines. Moreover, certain embodiments of the invention are capable of generating on-the-fly compressed backup files (e.g., full, differential, or incremental backup files) from a memory of a backup proxy machine.

As illustrated, the virtual computing environment 100 comprises a plurality of host servers 102, 104, 106 having a plurality of virtual machines 108, 110, 112, 114 that communicate with a datastore 116 via a fiber switch 118. In particular, the host server A 102 hosts virtual machine A 108 and virtual machine B 110, which interact, respectively, with data stored in virtual machine file system (VMFS) A 120 and VMFS B 122. Host server B 104 hosts virtual machine C 112, which interacts with data stored in VMFS C 124, and host server C 106 hosts virtual machine D 114, which interacts with data stored in VMFS D 126.

In certain embodiments, the host servers 102, 104, 106 comprise one or more computing devices configured to host one or more virtual machines executing above a hypervisor layer. In certain embodiments, the hypervisor is configured to decouple the physical hardware of the host server from the operating system(s) of the virtual machine(s). For instance, one or more of the host servers 102, 104, 106 can comprise an ESX server or other like virtualization platform. Such abstraction allows, for example, for multiple virtual machines with heterogeneous operating systems and applications to run in isolation on resources of the same physical machine.

In yet other embodiments, one or more of the host servers 102, 104, 106 can include a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

For illustrative purposes, the VMFS A 120 further comprises a VM_A.VMDK file 120a, which includes the virtual hard drive for the virtual machine A 108, and a VM_A.VMX file 120b, which includes configuration data for the virtual machine A 108. In certain embodiments, most of the .VMDK 120a file's content comprises the data of the virtual machine, while a small portion is allotted to overhead of the virtual machine.

In certain embodiments, the VM_A.VMDK file 120a can be a dynamic virtual disk in which the disk grows as the disk inside the guest operating system of the virtual machine A 108 grows. In yet other embodiments, the VM_A.VMDK file 120a can comprise a fixed size virtual disk. In certain embodiments of the invention, the virtual disk of a single virtual machine can comprise multiple .VMDK files. For instance, an administrator or other user can specify a maximum size of each .VMDK file (e.g., 2 GB chunks). In such embodiments, the number of .VMDK files depends on the size of the virtual disk.

As shown, the datastore 116 comprises a SAN or like shared storage network that includes a plurality of VMFSs for storing data for a plurality of virtual machines. In other embodiments, the datastore 116 can comprise any type of formatted logical container for holding virtual machine files and that can exist on a physical storage resource, including: local disks (e.g., local small computer system interface (SCSI) disks of the host server(s)), a disk array, an iSCSI disk array, NAS arrays, network file system (NFS), combinations of the same or the like.

As shown, each of the host servers 102, 104, 106 also communicates with a management server 128 through a network 130. In certain embodiments, management server 128 directs general operation of the host servers 102, 104, 106 and/or their associated virtual machines. For example, the management server 128 can comprise a VMWARE VirtualCenter management server that provides a centralized management module for the virtual environment, such as a VMWARE Infrastructure 3 (VI3) environment or the like.

In certain embodiments, the network 130 can comprise a local area network (LAN). In yet other embodiments, the network 130 can comprise one or more of the following communication means: internet, intranet, wide area network (WAN), public network, combinations of the same or the like. In addition, connectivity to the network 130 may be through, for example, remote modem, Ethernet, token ring, fiber distributed datalink interface (FDDI), asynchronous transfer mode (ATM), combinations of the same or the like.

The virtual computing environment 100 further comprises a backup proxy 132 usable to backup one or more virtual machine files. In certain embodiments, the backup proxy 132 is further capable of restoring backed-up virtual machines in the event of a disk failure or the like or if a user desires to revert to a previous version of a particular virtual machine.

In certain embodiments, the backup proxy 132 is configured to operate with a backup process, such as VMWARE Consolidated Backup (VCB), to perform storage operations on the virtual machine disks on the datastore 116. For example, the backup proxy 132 can advantageously, when used with SAN storage, enable offloaded and impact-free backups for virtual machines running on an ESX host server. Such an approach allows for the use of virtual machine snapshot technology and SAN-based data transfer in combination with file-based backup software. Moreover, VCB processes allow for the backing up of virtual machine contents from the backup proxy 132 rather than through one or more of the host servers 102, 104, 106. This approach can further allow for a reduction of the load on the host servers 102, 104 and 106 and allow for allocation of otherwise consumed resources to additional virtual machines.

As shown, the backup proxy 132 can advantageously access the datastore 116 through the fiber switch 118 without needing to communicate through the network 130 or any of the host servers 102, 104, 106. In yet other embodiments, the backup proxy 132 can operate in a LAN mode by communicating through the network 130 and at least one virtual machine of the host servers 102, 104, 106 to access data on the datastore 116.

In certain embodiments, the backup proxy 132 further communicates with the management server 128 through the network 130. For instance, the management server 128 can provide the backup proxy 132 with information regarding the infrastructure of the virtual computing environment 100, locations of certain virtual machine disks on the datastore 116, job scheduling, load or availability information, combinations of the same or the like.

In certain embodiments, the backup proxy 132 comprises a WINDOWS-based backup server. In yet other embodiments, the backup proxy 132 can comprise a LINUX-based server, an ESX server, combinations of the same or the like.

The backup proxy 132 is further illustrated with a plurality of modules and/or components executing thereon to perform one or more operations relating to the backing up of data. It will be understood, however, that this illustration is merely exemplary and that such modules or components can be executed on a plurality of computing devices, on one or more virtual machines, as stand-alone components, or the like.

The backup proxy 132 comprises a backup module 134 configured to obtain data from the datastore 116 for backup processing. In certain embodiments, the backup module 134 comprises the VCB utility that copies virtual machine disk data from the datastore 116 to the backup proxy 132 and then to an intended backup destination. For instance, the backup module 134 can provide a centralized management of agent-less backup of virtual machines.

In certain embodiments, the backup module 134 works in combination with a third-party backup agent that manages the backup schedule. Once instructed to begin a backup, the backup module 134 can run a set of pre-backup scripts to quiesce the virtual machine disks to take their snapshots (e.g., via a VMsnap command). The backup module 134 can then run post-thaw scripts to restore the virtual machine(s) back to normal operation. The backup module 134 can further mount the snapshot(s) to the backup proxy 132, from which the third-party backup agent backs up the files on the mounted snapshot to its backup targets. For example, the backup module 134 can utilize a virtual logic unit number (VLUN) that enables mounting of the virtual machine snapshot on the backup proxy 132 and makes the mounted drive available for backup.

In certain embodiments, the backup module 134 can perform various types of backups. For example, the backup module 134 can perform image-level backups to create a copy of all virtual disks and configuration files associated with a virtual machine. Such image-level backups can advantageously be operating-system neutral, as they involve copying the entire virtual machine disk data. In such embodiments, the backup module 134 can mount a snapshot of the virtual machine disk to a local directory of the backup proxy 132 to make the data accessible for being backed up.

In certain embodiments, the backup module 134 can perform file-level backups that include a copy of individual file(s) contained within one or more virtual machine disks. Moreover, the backups can comprise full backups, differential backups and/or incremental backups. In such embodiments, the backup module 134 can create a snapshot of the virtual machine disk and mount discovered volume(s) within the snapshot at predefined junction points.

The backup module 134 preferably stages data obtained from the datastore 116 in a memory 138 of the backup proxy 132 for being backed up. In certain embodiments, the memory 138 preferably comprises a buffer that serially receives the data in relatively small data blocks. In such embodiments, the buffer can have a memory capacity slightly more than the size of an individual data block. For example, in certain embodiments, the backup data is divided into 256 KB data blocks, wherein the memory 138 is slight larger (e.g., a number of bytes larger) than 256 KB in order to handle each individual data block and additional overhead associated therewith. In other embodiments, the data blocks and/or memory 138 can be a different size according to the requirements of the backup system. Moreover, in certain embodiments, the memory 138 can comprise multiple buffers for parallel processing of the data blocks.

An intercept module 136 is configured to intercept data obtained from the datastore 116 by the backup module 134 prior to storage on disk. For instance, once the backup module 134 has initiated a snapshot of the virtual machine disk to be backed up, the intercept module 136 can intercept the export of data from the snapshot and redirect the data to an alternative destination. During this redirecting, the data can be optionally compressed using the memory 138 and/or resources of the backup proxy 132. This redirection process can advantageously eliminate the need for additional disk space on the backup proxy 132 to temporarily house a copy of the backup data before copying the data to the final backup location.

In certain embodiments, the intercept module 136 comprises a plugin application installed on the backup proxy 132 that interacts with the backup module 134. For instance, the plugin can comprise a proxy application 137a that initiates one or more components of the backup module 134 responsible for general backup of the virtual machine disk(s) to a destination folder. The plugin can further comprise a library 137b, such as a dynamic link library (DLL), that is loaded in the address space of the backup module 134 to allow for the interception and/or replacement of select application programming interface (API) calls by the backup module 134 with customized functions of the DLL 137b. For instance, in certain embodiments, API calls CreateFile, WriteFile and CloseHandle are received and replaced with alternative methods for performing the backup functions disclosed in more detail herein.

In certain embodiments, the DLL 137b is configured to run a plurality of different backup procedures. For example, the DLL 137b can utilize a memory mapped file to set various arguments, wherein the name of the memory mapped file (or other shared memory) is created by the proxy application 137a and/or has the process identification (ID) of the proxy application 137a. Moreover, in a DllMain function of the DLL 137b, the DLL 137b reads the memory mapped file and, knowing the ID of the parent process (i.e., the proxy application 137a), utilizes the data in the memory mapped file (e.g., command line arguments) to configure itself for the backup operations.

Appendix A, which is attached hereto to be considered part of this specification, provides one example of a code file usable by the intercept module 136 to replace particular API calls with customized functions to create an alternative backup file.

A compression module 140 comprises an engine that compresses the backup data to be stored to disk. In certain embodiments, the compression module 140 processes data received from the memory 138 prior to the data being backed up to disk. For instance, such compression can occur in the memory pages 138 of the backup proxy 132. In certain embodiments, the compression module 140 can utilize a ZLIB or LZO data compression algorithm. In yet other embodiments, the compression module 140 can perform other and/or additional types of compression. In yet further embodiments, the compression module 140 can further encrypt the data to be backed up.

In certain embodiments, the compression module 140 provides a compression ratio range of one through nine to compress the data. This compression module 140 can further erase "white space" (e.g., allocated, but not used, disk space) in an image prior to compressing the data to further reduce the size of the image on disk.

In certain embodiments, as the copying and compression is taking place, the compressed backup data is streamed (e.g., through a pipeline configuration) to a backup location. In certain embodiments, the backup location can comprise a WINDOWS or LINUX destination or can comprise a particular VMFS or logical unit number (LUN).

A differential engine 142 is configured to generate signatures for data blocks to be backed up and to compare signatures of a second set of data blocks to determine like blocks. In certain embodiments, the differential engine 142 computes and stores MD4 signatures for 256 KB data blocks in a signature file, as discussed in more detail below with respect to FIG. 4. In yet other embodiments, the differential engine 142 can compute other types of signatures, digital fingerprints or the like.

The differential engine 142 can further store in a map 144 the signature file of one or more virtual machine disk files that have been backed up. For instance, the map 144 can store signatures of data blocks in virtual machine disk files that have been part of the last full backup. The differential engine 142 can then later access, during a differential backup process, the signatures stored in the map 144 to determine if corresponding data blocks have changed since the last full backup.

The backup proxy 132 further includes a user interface 146 for displaying to, and/or receiving from, a user information relating to storage operations of the backup proxy 132. In certain embodiments, the user interface 146 causes the display of one or more windows for obtaining user input and/or outputting status information with respect to the virtual environment.

The illustrated backup proxy 132 also includes a scheduler 148 that initiates one or more storage operations, such as full or differential backups, by the backup proxy 132. For instance, the scheduler 148 can indicate that a differential backup should be performed after a certain number of data modification operations have occurred and/or after a predetermined period of time since the last full backup. Moreover, in certain embodiments, the scheduler 148 can comprise one or more backup policies that dictate when a scheduled differential backup can trigger a full backup. For instance, if certain storage thresholds are exceeded by the differential backup (e.g., size difference between the full backup and the last differential backup, number of days since last full backup), a new full backup can be performed.

Although the backup proxy 132 has been described herein with respect to a physical machine, in other embodiments of the invention, the backup proxy 132 can be executed on one or more virtual machines. Moreover, other embodiments of the backup proxy 132 can function without one or more of the components illustrated in FIG. 1. For example, in certain embodiments of the invention, the backup proxy 132 can function without the scheduler 148.

When backing up data, the backup proxy 132 can store data to a plurality of sources. For instance, in certain embodiments, the backup proxy 132 outputs backup data to a local storage device 152, such as a locally attached disk drive. In other embodiments, the backup proxy 132 can store backed up data on the datastore 116, such as in a new technology file system (NTFS).

In yet other embodiments of the virtual computing environment 100, backup tools described herein can be used with other types of storage and/or network configurations. For instance, the backup proxy 132 may access the virtual machine data over a network connection, such as an IP network, rather than through a fiber switch. In yet other embodiments, backup operations can utilize both a volume shadow copy service (VSS), to temporarily quiesce data operations on a virtual machine, and the VCB utility tool to backup a consistent virtual machine image, as described in more detail in U.S. patent application Ser. No. 12/182,364, filed Jul. 30, 2008, which is hereby incorporated herein by reference in its entirety and, in particular, paragraphs 0040-0089 and FIGS. 2-4B.

Figure 2:
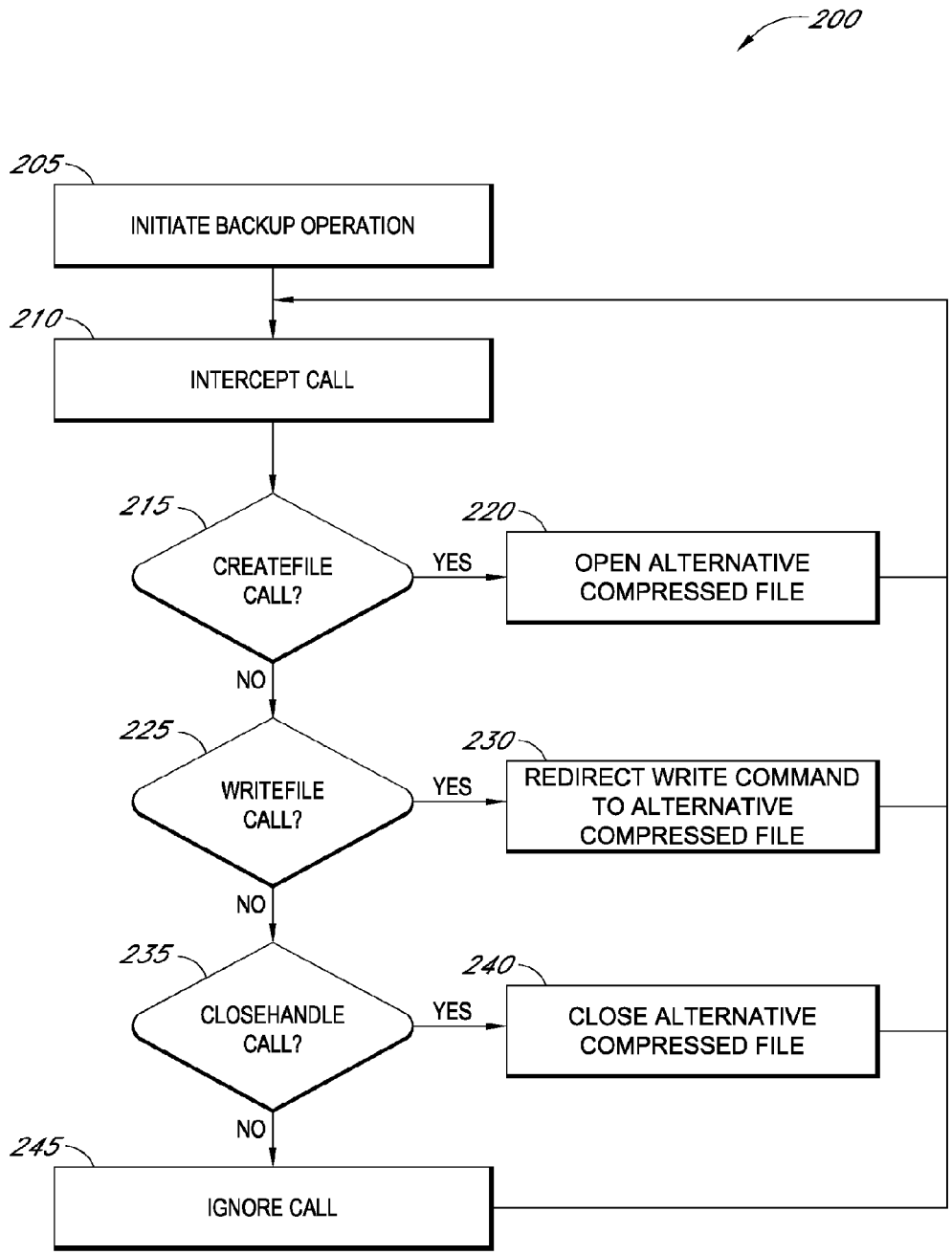
FIG. 2 illustrates a flowchart of an exemplary embodiment of an interception process usable by the backup proxy of FIG. 1 to create an alternative backup file.

FIG. 2 illustrates a flowchart of an exemplary embodiment of an interception process 200 usable by the backup proxy 132 of FIG. 1. For instance, the interception process 200 can be used to redirect writes in backing up data of one or more virtual machine disks. For illustrative purposes, the interception process 200 will be described herein with reference to the components of the virtual computing environment 100 in a VMWARE configuration and the exemplary code of Appendix A.

At Block 205, the proxy application 137*a* (e.g., vcblauncher.exe) causes the backup module 134 to begin the process of backing up a virtual disk to a destination folder. For instance, the proxy application 137*a* can initiate the vcbMounter.exe process of the VCB utility, which is responsible for creating a snapshot and mounting and/or copying virtual machine disks or files.

At Block 210, the intercept module 136 intercepts calls relating to the backing up of virtual machine disk data from the datastore 116. For instance, the intercept module 136 can intercept API calls made by the vcbMounter.exe process to back up the virtual machine disk or file. The intercept module 136 can then selectively replace certain API calls made by vcbMounter.exe with modified functions, as discussed in more detail below. For instance, the modified functions can be maintained in a detours library (e.g., vcbutility.dll) that is stored in the process space of vcbMounter.exe to perform improved backup of the virtual machine data. Such backups can include, but are not limited to: full compressed backups with signature collection, full compressed backups without signature collection, full non-compressed backups with signature collection, differential compressed backups, differential non-compressed backups, combinations of the same and the like.

At Block 215, the intercept module 136 determines if the API call intercepted from vcbMounter.exe comprises a CreateFile call. If so, the intercept module 136 replaces the call with an alternative function that opens an alternative compressed backup file (Block 220), and the process 200 returns to Block 210. For instance, the intercept module 136 can open the alternative compressed file at a location other than the default backup location for the backup module 134.

If at Block 225 the intercepted call comprises a WriteFile call, the intercept module 136 replaces the call with an alternative function that redirects the write command to the alternative compressed file (Block 230), and the process 200 returns to Block 210.

If at Block 235 the intercepted call comprises a CloseHandle call, the intercept module 136 replaces the call with an alternative function that closes the alternative compressed file (Block 240), and the process 200 returns to Block 210. Otherwise, the intercept module 136 ignores the call (Block 245), and the process 200 returns to Block 210.

Although the interception process 200 has been described with reference to a particular arrangement, other embodiments of the process 200 can include more or fewer blocks or states. For instance, the intercept module 136 can be configured to intercept only the CreateFile, WriteFile and CloseHandle calls, thereby removing Block 245 from the process 200.

In yet other embodiments, the intercept module 136 can be configured to identify other types of calls or functions other than those shown. For example, in certain embodiments, the intercept module 136 can redirect read calls to the alternative backup file. In yet other embodiments, the replacement functions can identify an alternative location for the backup file without compressing the data blocks of the backup file. In yet other embodiments, the intercept module 136 can be configured to compute signatures of the data blocks during a full backup and/or compare signatures of pairs of corresponding data blocks during a differential backup.

In embodiments of the invention wherein the backup module 134 comprises the VMware VCB utility, the interception process 200 can be further modified to ignore calls by the backup module 134 to create a new file wherein such creation comprises first reserving disk space for a backup file by writing placeholder data (e.g., digital zeros or ones) to the file location. For instance, in certain embodiments, when opening a new file, the VMware VCB utility will write to disk placeholder data to reserve the disk space and then close the newly written file. When preparing to write actual backup data, the VMware VCB utility will reopen the file to write the data.

In such embodiments of the invention, the interception process 200 can ignore the first call to open the placeholder file, but rather open an NTFS sparse file that makes it appear to the backup module 134 that the actual file was opened with the requested file size. Upon the second CreateFile request (i.e., to write actual backup data), the intercept module 136 can then proceed as in Blocks 215 and 220 to open and populate the alternative compressed file.

In certain embodiments, the proxy application 137a (e.g., vcblauncher.exe) that launches the backup process can be given a variety of parameters that define the scope of the backup. Such parameters can include a compressed backup instruction ("−c"), a differential backup feature disabled instruction ("−d0"), a full backup with data black signatures instruction ("−d1") and/or a differential backup instruction ("−d2").

Figure 3:
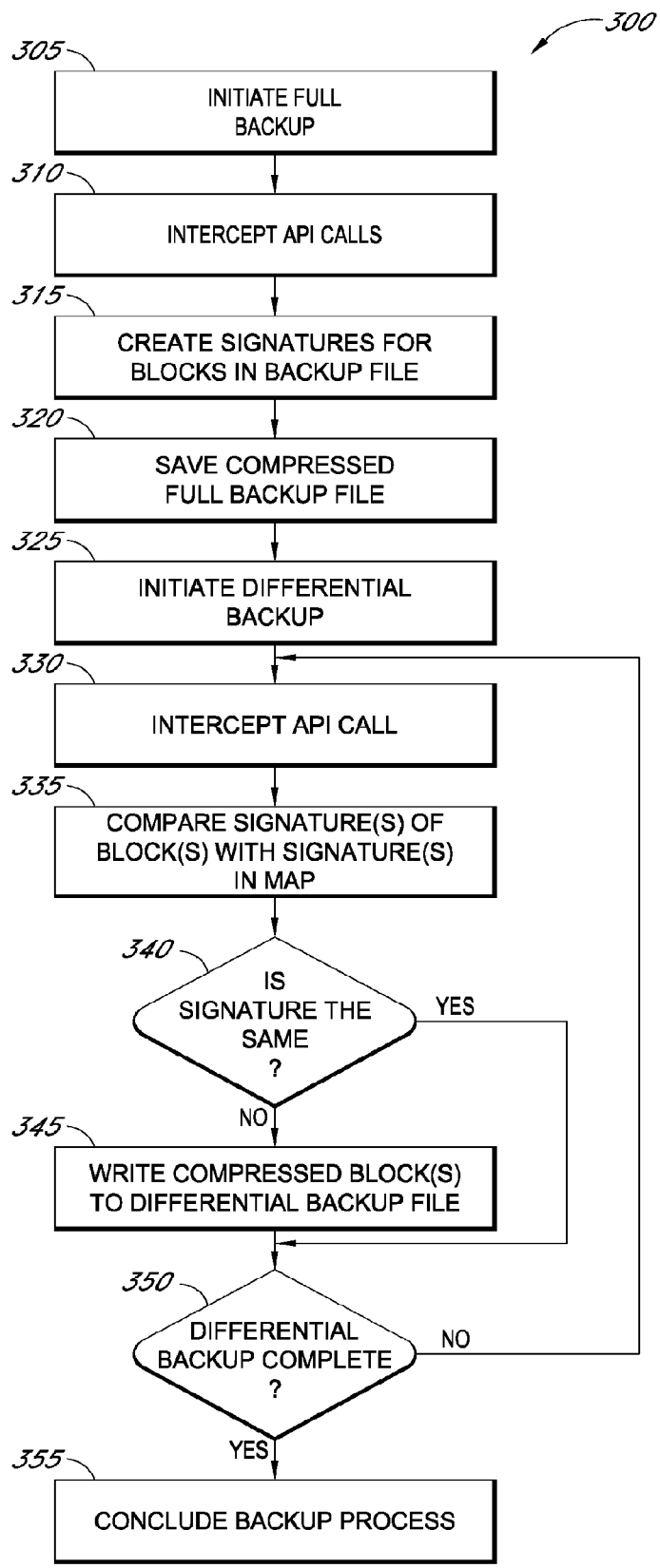
FIG. 3 illustrates a flowchart of an exemplary embodiment of a differential backup process usable by the backup proxy of FIG. 1.

FIG. 3 illustrates a flowchart of an exemplary embodiment of a differential backup process 300 usable in the virtual computing environment 100 of FIG. 1. In general, the backup process 300 can be performed to back up virtual machine disk files on a datastore. For exemplary purposes, the backup process 300 will be described primarily with reference to the components of the backup proxy 132.

During Blocks 305, 310, 315 and 320, the backup proxy 132 performs a full backup of one or more virtual machine disk files resident on the datastore 116. In certain embodiments, the full backup can be performed in a manner described with reference to the process 200 of FIG. 2. For instance, the full backup can be initiated at Block 305 by initiating the proxy application 137a (e.g., vcblauncher.exe) that instructs the backup module 134 to begin its process of backing up the virtual disk to a particular destination folder.

At Block 310, the intercept module 136 intercepts and selectively replaces API calls made by a component of the backup module 134 with customized functions to create and save a compressed backup file of the virtual machine disk file(s) without writing the backup data to a disk of the backup proxy 132 (Block 320). For instance, each of the data blocks associated with a write operation can be compressed and saved to an alternative destination on disk identified by the intercept module 136. In certain embodiments, ZLIB or LZO data compression is used, while in other embodiments, other types of compression can be performed. In yet other embodiments, the full backup can be performed without compression.

Prior to, concurrent with, or following the redirecting and saving of the compressed data to the alternative destination, the backup proxy 132 further creates signatures for each of the blocks of the backup file (Block 315). For instance, the differential engine 142 can compute or generate signatures for the data blocks of the backup file. In certain embodiments, each data block comprises a 256 KB data block, such as described in more detail below with respect to FIGS. 4-5C. In other embodiments, the data blocks can be of a different size, and/or other means for creating a digital signature for data can be used.

In yet other embodiments, the full backup can be performed without generating and storing signatures for each of the data blocks. For instance, a "dirty block" map can be maintained by the backup proxy 132, the management server 128 and/or the host servers to identify specific data blocks that are modified in the virtual machine disk(s) following a full backup of the disk(s).

In certain embodiments, the backup proxy 132 stores the signatures in the map 144 separate from the data of the compressed full backup.

At Block 325, the backup proxy 132 initiates a differential backup process. For instance, the differential backup can begin a predetermined time following the last full backup and/or after a certain amount of modifications to the virtual machine data has occurred. This initiating of the differential backup can be achieved, in certain embodiments, by initiating the proxy application 137a (e.g., vcblauncher.exe) that instructs the backup module 134 to begin the differential backup process.

Similar to Block 310, at Block 325, the intercept module 136 intercepts and redirects API calls received with respect to backing up virtual machine data. During Block 325, the backup proxy 132 can further generate a signature for every data block associated with a replaced WriteFile API call. For instance, in certain embodiments, the differential engine 142 computes an MD4 signature for each of the data blocks obtained from the virtual machine disk.

At Block 335, the signature of each of the data blocks in the differential backup operation is compared with the signature of the corresponding data block from the last full backup (e.g., signatures stored in the map 144). If the two signatures differ, it can be assumed that the particular data block has been modified since the time of the last full backup. Thus, if at Block 340 the signatures are different, the backup process 300 continues to write the compressed data block(s) to a differential backup file (Block 345). In yet other embodiments, the backup process 300 proceeds without compressing the data blocks of the differential backup.

If the signatures of the corresponding data blocks are the same, the backup process 300 disregards the specific block and loads a subsequent data block into the buffer memory 138. The process 300 then continues to Block 350 to determine if the differential backup is complete. For instance, the process 300 may determine if a CloseHandle API call was intercepted by the intercept module 136. If not, the backup process 300 continues to intercept additional API calls. Otherwise, the differential backup process 300 concludes at Block 355.

Although the process 300 has been described with reference to particular arrangements, other embodiments of the invention can include more or fewer blocks than those illustrated in FIG. 3. For instance, in certain embodiments, the process 300 can allow the backup module 134 to write data to the backup proxy 132 and the compress the data before it is written to disk. In yet other embodiments, the process 300 can utilize customized drivers (e.g., IFS drivers) in place of, or in addition to, intercepting write calls for writing the backup data to an alternative file.

Moreover, in embodiments of the invention wherein incremental backups are used in combination with full backups, Block 335 can comprise comparing the signatures of each data block associated with the differential backup with the signatures of corresponding data blocks of the full backup and any subsequent incremental backups.

FIG. 4 illustrates an exemplary embodiment of a signature file 400 usable during the backup process 300 of FIG. 3. In certain embodiments, the signature file 400 comprises an MD4 signature for each 256 KB data block that has been, or is to be, backed up as part of the backup process 300. In certain embodiments, the signature file 400 can be stored in the map 144.

As shown, the signature file 400 comprises a header 402 that lists the name of the disk file comprising the data blocks to which the plurality of signatures pertain. For instance, the name can comprise a fully qualified path of the virtual machine disk file. Following the header 402 is a file body 404 that comprises the signature of each data block of the virtual machine disk file. As shown, the file body includes the block numbers and corresponding MD4 signatures for data blocks 1-10.

In other embodiments, the signature file 400 can be generated using other types of message digest algorithms, cryptographic hash functions (e.g., collision-resistant, non-rolling hash functions), (digital) fingerprints, checksums, hash values, combinations of the same or the like. Moreover, the signatures can be calculated for block sizes other than 256 KB, such as smaller or larger data block sizes.

Figure 5B:
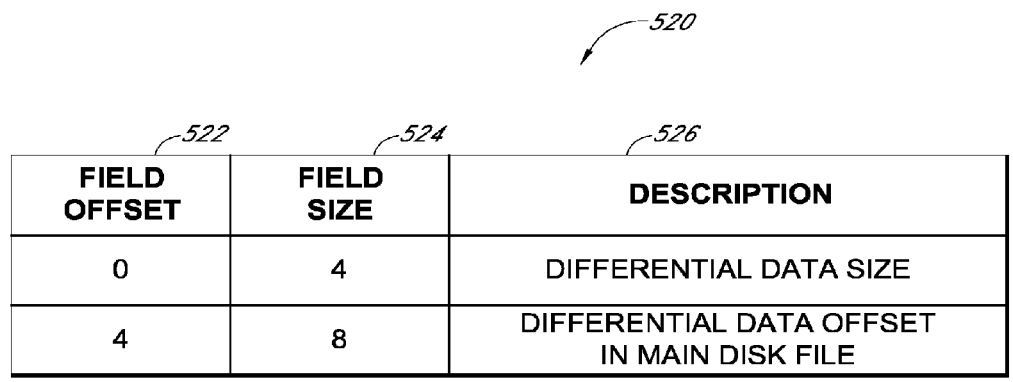
Figure 5C:
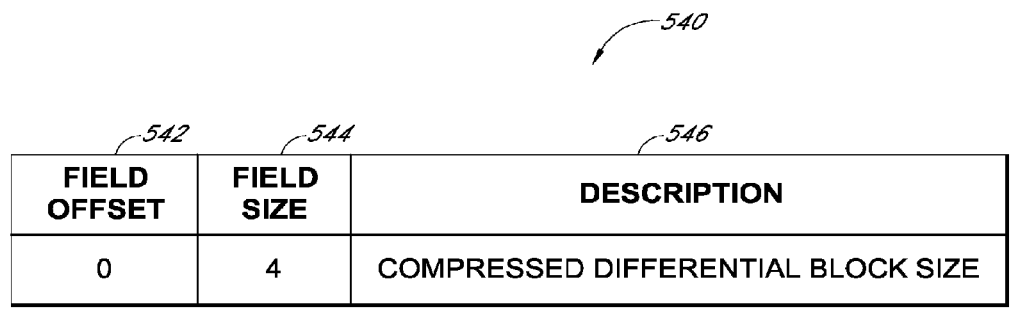

FIGS. 5A-5C illustrate exemplary embodiments of headers usable with a differential file created through the backup process 300 of FIG. 3. In particular, the illustrated headers can be used in a differential file that stores data blocks that were modified since the last full backup of a virtual machine disk.

FIG. 5A illustrates an exemplary embodiment of a format of a file header 500 of 512 bytes. The file header 500 includes a field offset column 502, a field size column 504 and a description 506. Each row of the file header 500 includes metadata related to the differential file, including a file identifier, file version, file creation time, and compression type. It should be understood from this disclosure, however, that other and/or additional types of metadata can be used in the file header 500. For instance, the file header 500 can comprise information for a backup archive file, including block directory links and/or offsets, header links combinations of the same or the like.

FIG. 5B illustrates an exemplary embodiment of a format of a data block header 520 of 12 bytes that precedes differential data. As shown, the data block header 520 also includes a field offset column 522, a field size column 524 and a description 526. Each row of the data block header includes metadata corresponding to the particular data block of the differential file, including a differential data size and a differential data offset that corresponds to the main disk file. Thus, in certain embodiments, each differential data block saved to disk comprises the data block header 520 and the differential data.

As discussed herein, differential data blocks can advantageously be compressed (e.g., using ZLIB or LZO data compression techniques) prior to being stored to disk. FIG. 5C illustrates an exemplary embodiment of a format of a compression header 540 of 4 bytes that proceeds the compressed differential data block. As shown, the compression header 540 also includes a field offset column 542, a field size column 544 and a description 546, which indicates the compressed differential block size. This compression header 540 can be saved to disk along with the compressed differential data.

Furthermore, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing backup of virtual machine data to a target datastore, the method comprising:
intercepting, by a backup computing device comprising a volatile memory and nonvolatile storage that is different from the target datastore, a plurality of calls made by a backup process to create a backup of one or more virtual machine disks to the target datastore, the one or more virtual machine disks comprising a plurality of data blocks, the plurality of intercepted calls comprising:

(1) at least one open call programmed to open a proxy backup file at a first destination location on the nonvolatile storage of the backup computing device, and
(2) at least one write call programmed to write a proxy backup copy of each of the one or more virtual machine disks to the proxy backup file at the first destination location on the nonvolatile storage of the backup computing device;

for each intercepted open call, the backup computing device substituting the open call with at least a second open call programmed to open a sparse file at the first destination location;

for each intercepted write call, the backup computing device substituting the intercepted write call with at least a second write call, wherein the at least the second write call is programmed to:
  transfer the data block associated with the particular intercepted write call to the volatile memory of the backup computing device without writing the data block to the nonvolatile storage of the backup computing device; and
  redirect the data block stored in the volatile memory to a second destination location on the target datastore that is different than the first destination location on the nonvolatile storage of the backup computing device, wherein the redirecting occurs without writing the data block to the nonvolatile storage of the computing device;

intercepting a call to close the proxy backup file; and
substituting, for the intercepted close call, a call programmed to close the second destination location on the target datastore.

2. The method of claim 1, additionally comprising:
computing a signature of the data block while the data block is stored in the volatile memory of the backup computing device, and
comparing the computed signature with a predetermined signature while the data block is stored in the volatile memory of the backup computing device.

3. The method of claim 2, additionally comprising, for each data block having a computed signature that matches the predetermined signature:
disregarding the data block rather than redirecting the data block to the second destination location on the target datastore.

4. The method of claim 2, additionally comprising performing a full or incremental backup of the one or more virtual machine disks prior to said intercepting a plurality of calls.

5. The method of claim 4, wherein said comparing comprises comparing the computed signature of the data block with the predetermined signature of a corresponding data block in the respective full or incremental backup of the one or more virtual machine disks.

6. The method of claim 1, additionally comprising compressing the data block while the data block is stored in the volatile memory of the backup computing device.

7. The method of claim 6, additionally comprising:
opening a compressed file at the second destination location on the target datastore; and
storing the redirected compressed data block in the compressed file.

8. The method of claim 1, additionally comprising informing the backup process when each of the plurality of data blocks has been written to the second destination location on the target datastore.

9. A method for performing backup of a virtual machine file, the method comprising:
intercepting, by a backup computing device comprising computer hardware, an open call for opening a proxy backup file at a first destination location on a proxy disk, the open call programmed to reserve space on the proxy disk for a requested size of the proxy backup file;
substituting, by the backup computing device, the open call with a second open call to open a target backup file at a second destination location on a backup datastore that is different from the proxy disk;
intercepting, by the backup computing device, a plurality of write calls for creating a backup copy of a plurality of data blocks of a virtual machine file at the first destination location on the proxy disk;
substituting, by the backup computing device, each intercepted write call with a second write call, wherein the second write call is programmed to:
  transfer the data block associated with the particular write call to a memory without first writing the data block to the proxy disk; and
  store the data block to the target backup file at the second destination location on the backup datastore without storing the data block on the proxy disk; and
intercepting a call to close the proxy backup file; and
substituting, for the intercepted close call, a call programmed to close the second destination location on the backup datastore.

* * * * *